United States Patent [19]

Ito

[11] Patent Number: 4,970,613
[45] Date of Patent: Nov. 13, 1990

[54] HEAD BASE SUPPORTING DEVICE IN AUTO-REVERSAL TAPE PLAYER

[75] Inventor: Kiyoyuki Ito, Iwanuma, Japan
[73] Assignee: Alps Electric Co., Ltd., Tokyo, Japan
[21] Appl. No.: 383,959
[22] Filed: Jul. 21, 1989
[30] Foreign Application Priority Data Oct. 4, 1988 [JP] Japan .......................... 63-130614[U]

[51] Int. Cl.⁵ .............................................. G11B 5/54
[52] U.S. Cl. .................................................. 360/105
[58] Field of Search ........................................ 360/105

[56] References Cited

U.S. PATENT DOCUMENTS 4,674,001 6/1987 Takahashi ...................... 360/105 X
4,757,403 7/1988 Hayashi et al. .

Primary Examiner—A. J. Heinz
Attorney, Agent, or Firm—Guy W. Shoup; Paul J. Winters

[57] ABSTRACT

A head base supporting device in an auto-reversal tape player for movably supporting a head base including a slide hole extending in a moving direction of the head base and an open end formed at an end of the slide hole opening in the retract direction of the head base; a guide projection formed on the chassis and adapted to engage the slide hole, the guide projection having a neck portion adapted to engage the slide hole in a slidable manner and a head portion formed at an end of the neck portion and having a width greater than a width of the slide hole, whereby the engagement portion of the head base is slidably engaged with the neck portion of the guide projection to movably support the head base; and a pair of disengagement preventing portions formed in the head base at positions such that when the head base is moved in the advance direction, either of the disengagement preventing portions is brought into opposition to a restriction pin abutting against a roller selection restricting portion of a selector lever, wherein a distance between the restriction pin and the disengagement preventing portion is set to be smaller than a distance allowing disengagement of the head portion of the guide projection from the open end of the slide hole.

1 Claim, 5 Drawing Sheets

HEAD BASE SUPPORTING DEVICE IN AUTO-REVERSAL TAPE PLAYER

BACKGROUND OF THE INVENTION

The present invention relates to an auto-reversal tape player, and more particularly to a head base supporting device in the auto-reversal tape player for supporting a head base mounting a magnetic head thereon to a chassis with the head base reliably prevented from being disengaged from the chassis without providing any stopper parts.

A conventional head base supporting device in the auto-reversal tape player is shown in FIG. 6. Referring to FIG. 6, reference numeral 1 designates a chassis provided with a pair of reel supports 2a and 2b for supporting a pair of tape reels in a cassette case (not shown) and rotatably driving either of the tape reels. A head base 3 mounting a magnetic head 4 thereon is supported on the chassis 1 in such a manner as to be movable in counter directions as depicted by a double-headed arrow A-B. When the head base 3 is moved in the direction A, the magnetic head 4 is brought toward a magnetic tape exposed from the cassette case, while when the head base 3 is moved in the direction B, the magnetic head 4 is moved away from the magnetic tape.

The head base 3 is formed with a slide hole 3a elongated in the directions A-B and a relatively wide hole 3c continuing from an open end 3b of the slide hole 3a. On the other hand, the chassis 1 is provided with a fixed guide projection 5 adapted to engage the slide hole 3a of the head base 3. The guide projection 5 is constructed of a neck portion 5a projecting from the chassis 1 and a head portion 5b formed at an upper end of the neck portion 5a and having a width greater than a width of the neck portion 5a. In mounting the head base 3 onto the chassis 1, the hole 3c of the head base 3 is fitted with the head portion 5b of the guide projection 5, and the head base 3 is then moved in the direction B to bring the slide hole 3a into slidable engagement with the neck portion 5a. Thus, the head base 3 is supported to the chassis 1 movably in the directions A-B.

In the above prior art head base supporting device, however, when the head base 3 is moved in the direction A to a position where the hole 3c is registered with the head portion 5b, the head base 3 is released from the chassis 1. To cope with this disadvantage, it is necessary to provide a stopper for restricting an amount of movement of the head base 3 in the direction A after mounting the head base 3 onto the chassis 1 and fix the stopper by using a screw. However, there is a possibility that the screw will be loosened or an external force is applied to the stopper to cause slippage of the stopper and resultant disengagement of the head base 3 from the chassis 1.

SUMMARY OF THE INVENTION

It is an object of the present invention to provide a head base supporting device in an auto-reversal tape player which may reliably prevent disengagement of the head base from the chassis without providing any stopper parts.

According to the present invention, there is provided in an auto-reversal tape player including a chassis; a pair of reel supports provided on said chassis for supporting a pair of tape reels; a pair of capstans adapted to be driven in counter directions; a pair of pinch rollers opposed to said capstans; a pair of holders movably supported to said chassis for rotatably supporting said pinch roller, each holder having a restriction pin; a magnetic head adapted to releasably contact a magnetic tape; a head base movably mounted on said chassis for mounting said magnetic head, said head base being adapted to be driven in an advance direction for bringing said magnetic head toward said magnetic tape and in a retract direction for moving said magnetic head away from said magnetic tape, said head base having a pair of roller restricting portions for stopping movement of said restriction pins toward said capstans when said head base is moved in said retract direction and a selector lever adapted to be moved in counter directions perpendicular to the moving directions of said head base, said selector lever having a pair of roller selection restricting portions for restricting the movement of either of said restriction pins according to the moving direction of said selector lever; a head base supporting device comprising an engagement portion formed in said head base, said engagement portion having a slide hole extending in the moving directions of said head base and an open end formed at an end of said slide hole opening in the retract direction of said head base; a guide projection formed on said chassis and adapted to engage said engagement portion, said guide projection having a neck portion adapted to engage said slide hole in a slidable manner and a head portion formed at an end of said neck portion and having a width greater than a width of said slide hole, whereby said engagement portion of said head base is slidably engaged with said neck portion of said guide projection to movably support said head base; and a pair of disengagement preventing portions formed in said head base at positions such that when said head base is moved in the advance direction, either of said disengagement preventing portions is brought into opposition to said restriction pin abutting against said roller selection restricting portion of said selector lever, wherein a distance between said restriction pin and said disengagement preventing portion is set to be smaller than a distance allowing disengagement of said head portion of said guide projection from said open end of said slide hole.

In the auto-reversal tape player as mentioned above, the movement of either of the pair of restriction pins formed with the holders for supporting the pair of pinch rollers is restricted by either of the pair of roller selection restricting portions formed in the selector lever according to the moving direction of the selector lever. Accordingly, the remaining pinch roller not restricted is allowed to come into contact with the corresponding capstan. At this time, the restriction pin of the holder supporting the pinch roller not contacting the corresponding capstan abuts against the roller selection restricting portion of the selector lever, and one of the disengagement preventing portions is brought into opposition to the restriction pin at the predetermined distance. When the head base is moved by an external force to advance under the above condition, the disengagement preventing portion is moved by the predetermined distance, and is brought into abutment against the restriction pin. Since the predetermined distance is set to be smaller than the distance allowing disengagement of the head portion of the guide projection from the open end of the slide hole of the head base, the guide projection is prevented from disengaging from the slide hole. Therefore, it is possible to reliably prevent the head base from being disengaged from the chassis without the need of providing any stopper parts.

Other objects and features of the invention will be more fully understood from the following detailed description and appended claims when taken with the accompanying drawings.

DETAILED DESCRIPTION OF THE PREFERRED EMBODIMENT

There will now be described a preferred embodiment of the present invention with reference to FIGS. 1 to 5.

Figure 1:
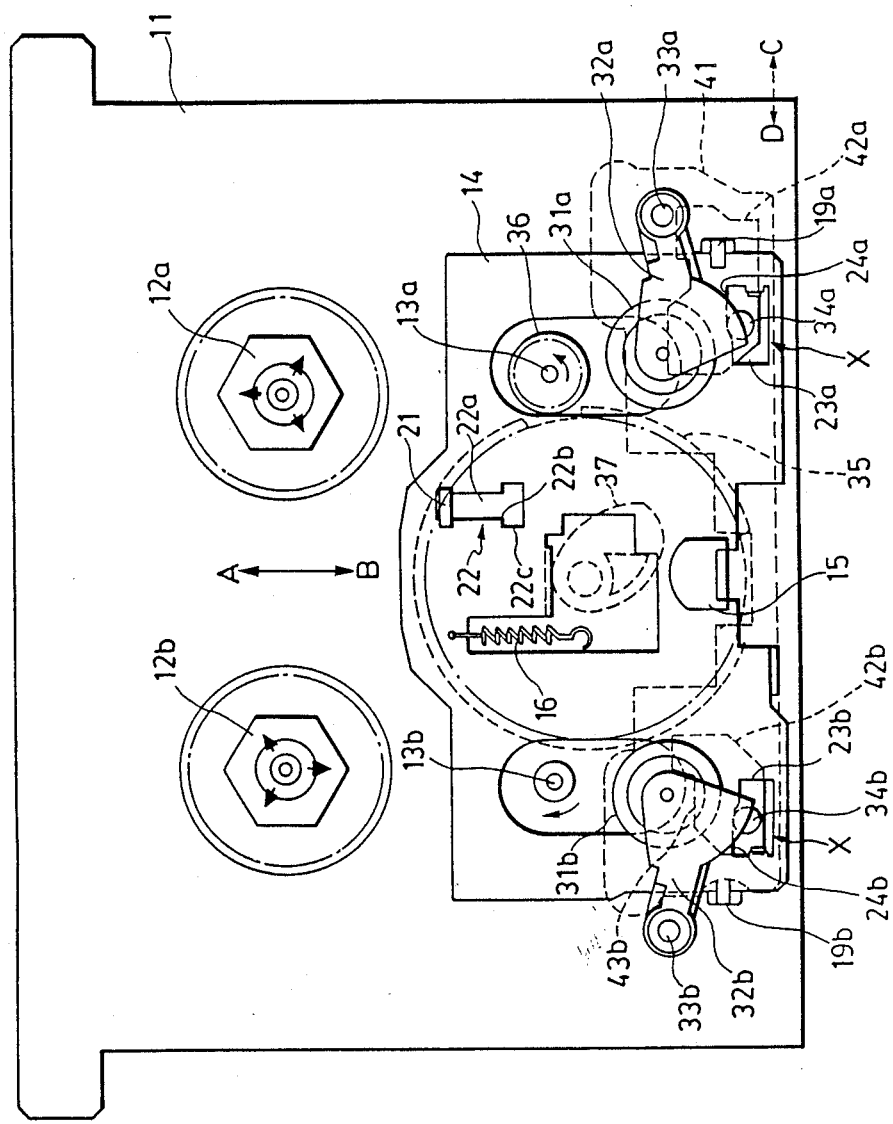
FIG. 1 is a plan view of a cassette mounting portion of the auto-reversal tape player in a stop mode thereof according to the present invention.

Referring to FIG. 1, reference number 11 designates a chassis provided with a pair of reel supports 12a and 12b and a pair of capstans 13a and 13b adapted to be rotated in counterclockwise and clockwise directions, respectively.

Reference numeral 14 designates a head base for mounting a magnetic head 15. The head base 14 is supported on the chassis 11 movably in a direction of arrow A (advance direction) and a direction of arrow B (retract direction), and is normally biased in the direction B by a return spring 16. Specifically, the head base 14 is supported at its central upper position as viewed in FIG. 1 by a guide projection 21 formed on the chassis 11, and is also supported at opposite lower side positions by a pair of guide members 19a and 19b formed on the chassis 11. As inlargedly shown in FIG. 5, the guide projection 21 is composed of a neck portion 21a and a head portion 21b integrally formed with the neck portion 21a. The head base 14 is formed with an elongated slide hole 22a adapted to slidingly engage the neck portion 21a of the guide projection 21 and with a relatively wide hole 22c continuing from an open end 22b of the slide hole 22a. In mounting the head base 14 onto the chassis 11, the wide hole 22c of the head base 14 is brought into engagement with the guide projection 21, and the head base 14 is then moved in the direction B to slide the slide hole 22a relative to the neck portion 21a of the guide projection 21, thus slidably supporting the head base 14 to the chassis 11. Further, the head base 14 is formed at its opposite lower side portions with a pair of restriction holes 23a and 23b. Upper edges of the restriction holes 23a and 23b are formed to serve as a pair of roller restricting portions 24a and 24b, respectively.

A pinch roller 31a is opposed to the capstan 13a, and a pinch roller 31b is opposed to the capstan 13b. The pinch roller 31a is retained by a holder 32a pivotably supported to a shaft 33a, and the pinch roller 31b is retained by a holder 32b pivotably supported to a shaft 33b. The holder 32a is integrally formed with a restriction pin 34a, and the holder 32b is integrally formed with a restriction pin 34b. The restriction pins 34a and 34b may be formed as rotating shafts of the pinch rollers 31a and 31b. The restriction pins 34a and 34b extend through the restriction holes 23a and 23b of the head base 14 to a back surface of the chassis 11.

As shown in FIG. 1, lower edge portions of the restriction holes 23a and 23b of the head base 14 are formed as the disengagement preventing portions X for preventing disengagement of the head base 14 from the chassis 11 according to the present invention.

Reference numeral 35 shown in FIG. 1 designates a selector gear adapted to be driven by a drive gear 36 rotating with the capstan 13a. The selector gear 35 is integrally provided with a head base driving cam 37 in such a manner that when the selector gear 35 is driven, the head base 14 is moved in the direction A by the head base driving cam 37.

Figure 2:
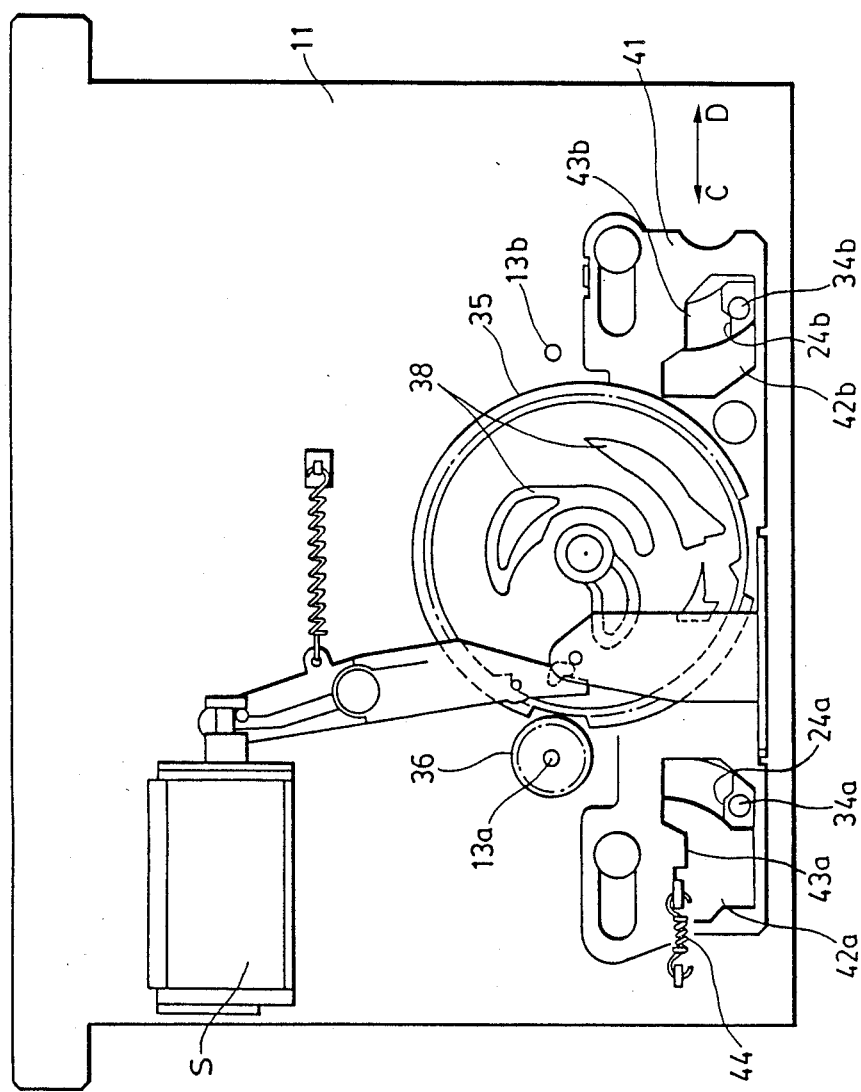
FIG. 2 is a bottom plan view of FIG.1.
Figure 3:
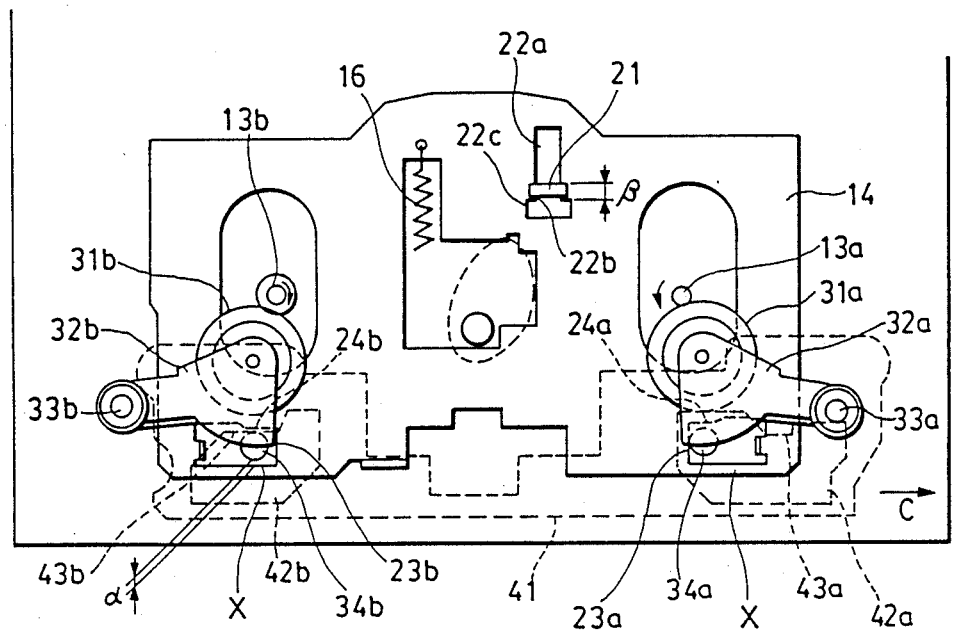
FIG. 3 is a partial plan view of the cassette mounting portion shown in FIG. 1, illustrating a forward play mode of the auto-reversal tape player.

Referring to FIG. 2, a selector lever 41 is supported on the back surface of the chassis 11 movably in opposite directions of arrows C and D, and is normally biased in the direction C by a return spring 44. The selector lever 41 is driven in the direction C or D by a cam 38 formed on a back surface of the selector gear 35. An operating timing of the selector gear 35 is set by a trigger solenoid S. The selector lever 41 is formed at its opposite end portions with a pair of selector holes 42a and 42b. Upper edge portions of the selector holes 42a and 42b are formed as a pair of roller selection restricting portions 43a and 43b, respectively. The restriction pins 34a and 34b extending from the holders 32a and 32b of the pinch rollers 31a and 31b pass through the restriction holes 23a and 23b of the head base 14 into the selector holes 42a and 42b of the selector lever 41, respectively.

In the auto-reversal tape player as mentioned above, the selector lever 41 is moved in either of the direction C or D to be positioned. FIGS. 1 and 2 show a stop mode as a waiting condition before transfer to a forward play mode. In this stop mode, the selector lever 41 is moved to the direction C and retained by the return spring 44, and the head base 14 is retracted in the direction B. Accordingly, the restriction pins 34a and 34b are urged in the direction B by the roller restricting portions 24a and 24b of the restriction holes 23a and 23b of the head base 14, respectively, thereby restricting the holders 32a and 32b in the counterclockwise and clockwise directions, respectively, and separating the pinch rollers 31a and 31b from the capstans 13a and 13b, respectively.

Figure 4:
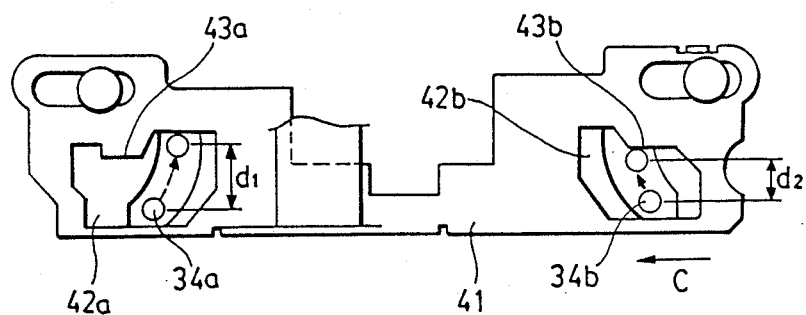
FIG. 4 is a bottom plan view FIG. 3.
Figure 5:
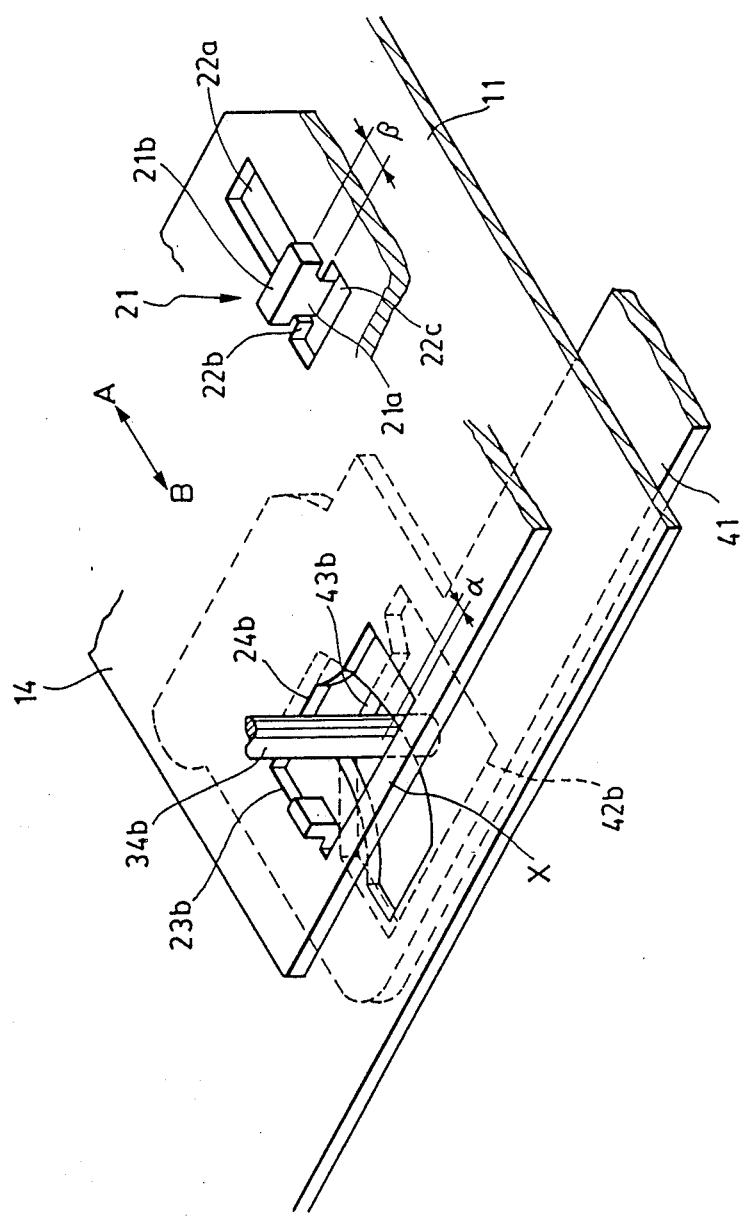
FIG. 5 is a perspective view of the essential part of the present invention.
Figure 6:
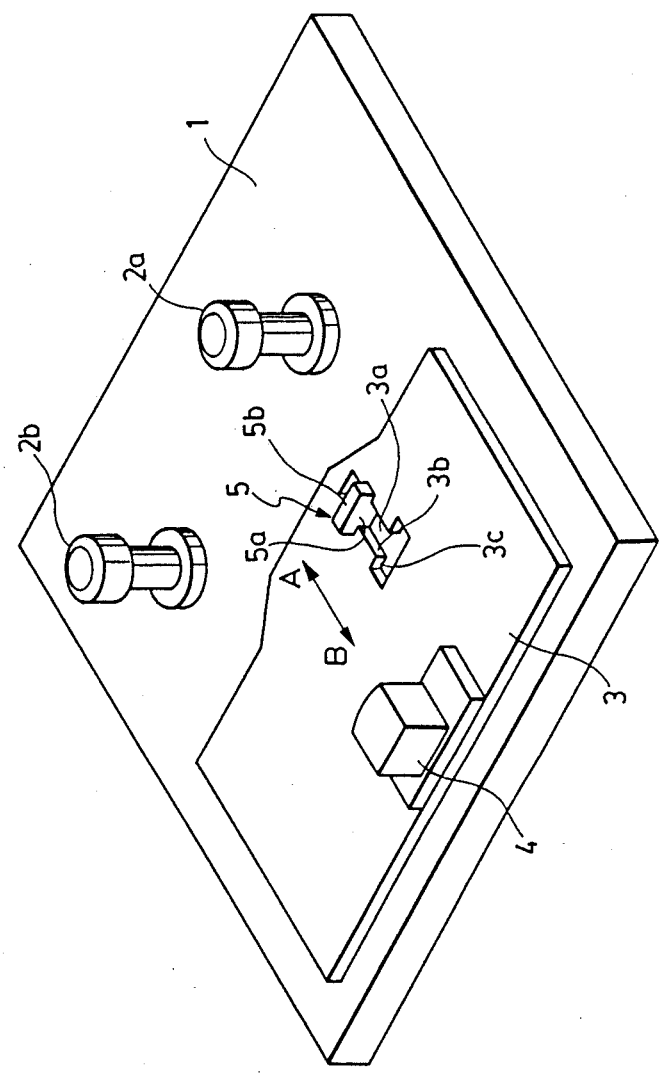
FIG. 6 is a perspective view of the head base supporting device in the auto-reversal tape player in the prior art.

When the head base 14 is advanced from the stop mode as mentioned above, the forward play mode is obtained. The advance of the head base 14 in the direction A is effected by driving the selector gear 35 and the head base driving cam 37. In the advance operation of the head base 14, the restriction pins 34a and 34b having restricted by the restriction holes 23a and 23b are allowed to advance in the direction A, and the pinch rollers 31a and 31b are resiliently urged toward the capstans 13a and 13b by springs (not shown) provided between the head base 14 and the holder 32a and between the head base 14 and the holder 32b, respectively. At this time, since the roller selection restricting portion 43b of the selector hole 42b comes into location on the front side of the restriction pin 34b by the movement of the selector lever 41 in the direction C, the advance of the restriction pin 34b in the direction A is restricted by the roller selection restricting portion 43b. Accordingly, when the head base 14 is advanced in the direction A, the restriction pin 34b is allowed to advance only a restricted distance of $d_2$ as shown in FIG. 4, and the pinch roller 31b is not brought into contact with the capstan 13b but remains separate therefrom. On the other hand, the restriction pin 34a is allowed to advance a relatively large distance of $d_1$ as shown in FIG. 4, and the pinch roller 31a is therefore brought into contact with the capstan 13a. Therefore, a magnetic tape is pinched between the capstan 13a and the pinch roller 31a rotating in the counterclockwise direction, and is fed rightwardly as viewed in FIG. 3. At this time, the magnetic head 15 is also advanced with the head base 14 to come into contact with the magnetic tape, thereby reproducing information recorded on the magnetic tape.

Under the above-mentioned condition where the restriction pin 23b of the holder 32b abuts against the roller selection restricting portion 43b of the selector lever 41, the disengagement preventing portion X formed by the lower edge of the restriction hole 23b is disposed behind the restriction pin 34b with a distance $\alpha$ defined therebetween. The distance $\alpha$ is set to be smaller than a distance $\beta$ allowing disengagement of the head portion 21b of the guide projection 21 from the open end 22b of the slide hole 22a. Even when the head base 14 is urged in the direction A by an external force, it is not allowed to advance more than the distance $\alpha$ since the restriction pin 34b is hindered from advancing in the direction A because of the abutment against the roller selection restricting portion 43b of the selector lever 41. Furthermore, since the distance $\alpha$ is smaller than the distance $\beta$ as mentioned above, the head portion 21b of the guide projection cannot disengage from the hole 22c of the head base 14. This operation is similarly exhibited in the stop mode shown in FIGS. 1 and 2. That is, when the head base 14 is forcibly urged in the direction A by an external force under the condition where the selector lever 41 is moved in the direction C to be positioned, the disengagement preventing portion X of the restriction hole 23b of the head base 14 is brought into abutment against the restriction pin 34b and urges the same in the direction A. However, since the restriction pin 34b is brought into abutment against the roller selection restricting portion 43b of the selector lever 41, it is hindered from advancing in the direction A. Therefore, the head base 14 cannot advance more than the distance $\alpha$. Since the distance $\alpha$ is set to be smaller than the distance $\beta$, the open end 22b of the slide hole 22a is prevented from disengaging from the guide projection 21.

In selecting a reverse play mode, the selector lever 41 is moved in the direction D to be positioned. At this time, the roller selection restricting portion 43a of the selector lever 41 is brought into opposition to the restriction pin 34a in the advance position thereof. Under the condition, when the head base 14 is moved to advance in the direction A, the advancing of the restriction pin 34a in the direction A is restricted by the roller selection restricting portion 43a, thereby hindering the pinch roller 31a from contacting the capstan 13a. On the other hand, the roller selection restricting portion 43b is not disposed in opposition to the restriction pin 34b in the advance position thereof. Accordingly, the pinch roller 31b is allowed to contact the capstan 13b. As a result, the magnetic tape is pinched between the capstan 13b and the pinch roller 31b rotating in the clockwise direction, and is fed leftwardly as viewed in FIG. 1. Simultaneously, the magnetic head 15 is brought into contact with the magnetic tape to effect reverse reproduction.

In the above-mentioned reverse play mode, the disengagement preventing portion X formed by the lower edge of the restriction hole 23a of the head base 14 is disposed behind the restriction pin 34a with the distance $\alpha$ defined therebetween. Since the distance $\alpha$ is set to be smaller than the distance $\beta$ as previously mentioned, the head base 14 is prevented from disengaging from the guide projection 21. Further, in the stop mode where the selector lever 41 is moved in the direction D to be positioned, and the head base 14 is retracted in the direction B, even when the head base 14 is forcibly moved in the direction A, it is prevented from disengaging from the guide projection 21 in the same manner as above.

In mounting the head base 14 onto the chassis 11 or demounting the former from the latter, the holders 32a and 32b with the pinch rollers 31a and 31b are preliminarily removed. Accordingly, the head base 14 is freely moved in the direction A without being restricted by the restriction pins 34a and 34b of the holders 32a and 32b. As a result, the head portion 21b of the guide projection 21 can be registered with the hole 22c of the head base 14 to thereby allow the head base 14 to be mounted and demounted with respect to the chassis 11.

Although the open end 22b of the slide hole 22a is connected to the hole 22c of the head base 14 in the above preferred embodiment, the open end 22b may be formed at the lower edge of the head base 14 in such a manner that the slide hole 22a is slidably engaged with the guide projection 21. Also in this case, the distance $\beta$ allowing the open end 22b (the lower edge of the head base 14) to come into disengagement from the guide projection 21 is set to be greater than the distance $\alpha$ as previously defined, so as to prevent the head base 14 from disengaging from the chassis 11.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In an auto-reversal tape player including a chassis; a pair of reel supports provided on said chassis for supporting a pair of tape reels; a pair of capstans adapted to be driven in counter directions; a pair of pinch rollers opposed to said capstans; a pair of holders movably supported to said chassis for rotatably supporting said pinch roller, each holder having a restriction pin; a magnetic head adapted to releasably contact a magnetic tape; a head base movably mounted on said chassis for mounting said magnetic head, said head base being adapted to be driven in an advance direction and in a retract direction, said advance direction being toward an exposed portion of said magnetic tape and said retract direction being away from said exposed portion of said magnetic tape, said head base having a pair of roller restricting portions for stopping movement of said restriction pins toward said capstans when said head base is moved in said retract direction; and a selector lever adapted to be moved in counter directions perpendicular to the moving directions of said head base, said selector lever having a pair of roller selection restricting portions for restricting the movement of either of said restriction pins according to the moving direction of said selector lever; a head base supporting device comprising:

an engagement portion formed in said head base, said engagement portion having a slide hole extending in the moving directions of said head base and an open end formed at an end of said slide hole opening in the retract direction of said head base;

a guide projection formed on said chassis and adapted to engage said engagement portion, said guide projection having a neck portion adapted to engage said slide hole in a slidable manner and a head portion formed at an end of said neck portion and having a width greater than a width of said slide hole, whereby said engagement portion of said head base is slidably engaged with said neck portion of said guide projection to movably support said head base; and a pair of disengagement preventing portions formed in said head base at positions such that when said head base is moved in the advance direction, either of said disengagement preventing portions is brought into opposition to said restriction pin abutting against said roller selection restricting portion of said selector lever, wherein a distance between said restriction pin and said disengagement preventing portion is set to be smaller than a distance allowing disengagement of said head portion of said guide projection from said open end of said slide hole.

* * * * *